June 5, 1956 R. G. PECHIN, JR 2,748,428
CONDENSER APRONS FOR CARDING MACHINES
Filed July 25, 1952
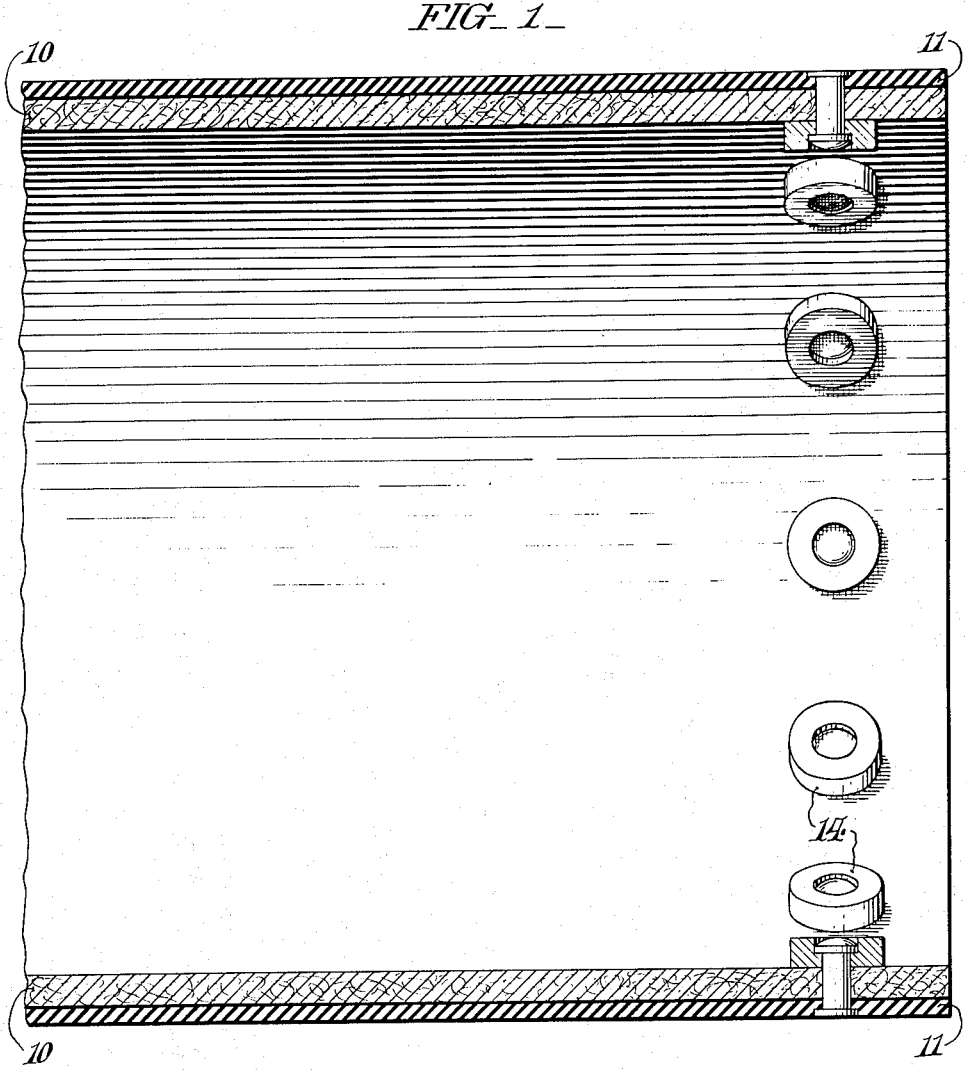
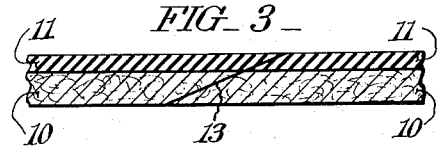
INVENTOR.
*Rene G. Pechin, Jr.*,
BY *Paul & Paul*
ATTORNEYS

United States Patent Office 2,748,428
Patented June 5, 1956

2,748,428

CONDENSER APRONS FOR CARDING MACHINES

Rene G. Pechin, Jr., Huntingdon Valley, Pa.

Application July 25, 1952, Serial No. 300,851

1 Claim. (Cl. 19—153)

This invention relates to condenser aprons for carding machines and more particularly relates to a condenser apron comprising an inner or base layer of leather with an outer or face layer of neoprene rubber or other oil-resistant rubber composition secured thereto.

Condenser aprons are short endless bands running over parallel rolls and generally arranged in pairs to present opposed flat surfaces between which rovings are fed preparatory to being spun into yarn. The rolls are rotated and at the same time longitudinally reciprocated, imparting both movements to the aprons so that the rovings are subjected, simultaneously, to a lengthwise advancing movement and to a transverse condensing rolling movement.

Condenser aprons were originally made of leather, but such aprons proved to be unsatisfactory on certain stocks. One difficulty was the tendency of the leather, being porous by nature, to absorb and retain dirt, oils, and other foreign matter in the roving fibers thereby glazing.

Attempts to replace leather aprons with rubber aprons also failed to achieve the desired results. Although rubber aprons were found to be more efficient than leather aprons in so far as their condensing property was concerned, they were unable to withstand for very long the deteriorating effect of the oils in the fibers. As a result, rubber aprons in a relatively short period of time would tend to swell, to lose their pliability and to break down in structure. Because of their relatively short life, rubber aprons were never widely used.

In an attempt to utilize the beneficial properties of rubber, aprons were developed which were constructed with a base layer of fabric and a face layer of a highly oil-resistant rubber composition. The most successful rubber composition for this purpose was found to be neoprene, a synthetic rubber technically known as polymerized chloroprene. Such aprons, although eliminating in part some of the difficulties encountered with leather and rubber aprons, have not proven to be entirely satisfactory. The major difficulty has arisen from the loss of stiffness that develops as the rubber facing wears—the fabric foundation supplying only a negligible stiffening quality to the apron. As the rubber facing wears down, "doubling over" or "buckling"—the longitudinal folding of the apron upon itself due to its reciprocal motion—tends to occur resulting in damage to the rovings. Another difficulty arises whenever a "wrap around" occurs, i. e. whenever a roving parts and the advancing loose end thereof is wrapped completely around the apron, becoming thicker and thicker with each full revolution of the apron. Due to the lack of stiffness in the fabric, such a "wrap around," if not immediately corrected, will wear a groove into the neoprene face of the apron, thus rendering it useless for further condensing. Another difficulty encountered with the rubber-fabric aprons has been the formation of "blisters," caused by the rubber separating from the fabric, due in part from the failure of the fabric to stretch with the rubber during passage of the apron around the rolls, which not only reduce the condensing property of the apron, but also result in injury to the rovings. A further difficulty encountered with such aprons is found in the fact that the fabric, lacking resilience, will not "give" under presure sufficient to relieve the tension on the guide buttons resulting from the reciprocating movement of the rolls, with the result that the buttons may be sheared off.

The present invention, directed to an apron comprising a leather base and a face layer of neoprene or other oil-resistant rubber composition, has succeeded in overcoming the above objections to rubber-fabric aprons. The use of a base layer of leather succeeds in imparting to the apron a stiffness which the fabric base failed to achieve and thereby eliminates the "buckling" or "doubling over" difficulties encountered in fabric-rubber aprons. The damaging effect of "wrap arounds" is also eliminated, since the rovings, due to the stiffening effect of the leather, will not wear a groove into the rubber facing. "Blisters" are also eliminated since the leather (1) being highly porous, is more securely bonded to the rubber facing and (2) being somewhat resilient, will stretch slightly with the rubber. In fact, experience has shown that when neoprene cement is used to bond the facing to the leather, the grip is so secure that the rubber will tear before it will separate from the leather. In addition to overcoming the foregoing objections, the apron which is the subject of the present invention has the additional advantage that when the facing is worn down, the leather base itself will continue to act as a condensing apron—thus prolonging the life of successful apron operation. A further advantage of the present invention over the rubber-fabric apron resides in the resiliency of the leather which eliminates the tendency of the apron to sheer the guide buttons when under pressure due to the reciprocation of the rolls.

These and other advantages and objects of the invention will be better understood from the following description of a preferred embodiment thereof, reference being had to the accompanying drawing wherein:

Fig. 1 is a fragmentary sectional view showing the internal construction of the condenser apron;

Fig. 2 is a fragmentary sectional view showing the lap seam of the apron immediately prior to being joined; and Fig. 3 is a fragmentary sectional view showing the lap seam when joined to complete the formation of the apron.

In Fig. 1, the numeral 10 represents the leather base of the apron and the numeral 11 the rubber face coating, preferably neoprene. It has been found in practice that the best condensing performance is obtained when the leather base 10 is about twice the thickness of the neoprene face 11. A desirable apron for use in condensing wool, for example, would be one having a leather base of .120 inch in thickness and a neoprene face of .0625 inch in thickness. The neoprene face 11 may be cemented, glued or vulcanized onto the leather base 10. However, in view of the porous quality of tanned leather which results in a high adhesive ability, it is preferred to secure the neoprene facing 11 to the leather base 10 by means of a rubber base cement, such as compounded neoprene cement.

The construction of a preferred form of apron of this invention is as follows. The leather base 10 is formed from tanned leather stock and the resulting flat strip is buffed or sanded on the side which is to be immediately adjacent to the neoprene facing. The neoprene facing 11, likewise made from basic stock, is cut to the same dimensions as the leather base 10 and the resulting flat strip sanded or buffed on one side. After buffing (or sanding) a coat of neoprene cement is applied to the buffed surfaces of the leather and neoprene strips and permitted to remain thereon exposed to the atmosphere at room temperature for a period of approximately fifteen minutes. Thereafter, a second coat of neoprene cement is applied over the first coatings on the leather and neoprene strips and permitted to remain exposed to the atmosphere at room temperature for a period of approximately thirty minutes. Thereupon the coated surfaces of the leather and neoprene strips are placed together and the resulting apron blank rolled to insure maximum surface contact. The blank is permitted to "cure" by standing at room temperature for a period of twenty-four hours before final assembly. Maximum adhesion is not developed immediately, but increases gradually with curing. Due to the porous condition of the leather, the cement will penetrate deep thereinto, thus setting up an extremely strong bond with the neoprene facing.

In the event a higher initial adhesion is desired between the leather and neoprene facing, the procedure set forth above would be followed except that after the thirty minute period following the application of the second coat of cement the coated leather and neoprene strips are placed in an oven heated to a temperature of 70° C. for a period of thirty minutes. Thereafter the strips are removed, placed together and rolled, while still hot, and cured.

After the apron blank is cured, a lap 12 is formed on each end thereof by a skiving machine. The laps 12 are then sanded and coated with two coats of neoprene cement, the cement coatings being applied in the same manner as they were applied to the leather and neoprene strips discussed above. The laps 12 are then joined together under pressure and permitted to "cure" for a period of twenty-four hours, thus completing formation of the apron. The finally united lap joint 13 is shown in Fig. 3.

After the lap joint has cured, the apron is ground to an even gauge or thickness and spaced guide buttons 14 are riveted to each end thereof in a manner well known in the art. The apron is now complete and ready for immediate use.

The apron produced by my invention has proven to have a materially longer life than the leather, rubber and rubber-fabric aprons that have been heretofore used by the textile industry. Further, not only does the leather base itself continue to serve as an apron when the neoprene facing has been worn down, but it is also possible to re-coat the leather with a new neoprene facing so as to fully restore the apron and thereby effect substantial economy in the condensing operation.

While a preferred embodiment of the invention has been herewith described and illustrated, it is to be understood that various equivalents may be utilized or resorted to without departing from the invention or the scope of the claim.

I claim:

In a condenser apron for subjecting rovings simultaneously to a longitudinal advancing movement and to a transverse rolling movement, the combination comprising an inner base in the form of an endless sheet of leather, an outer facing of unreinforced sheet neoprene on said leather, said leather being about twice as thick as said neoprene, said neoprene extending over substantially the entire surface of said leather and having a side edge which coincides with the side edge of the leather base, an intermediate bond of neoprene cement which is affixed to said neoprene facing and to said leather base to secure the same together, a plurality of guide buttons disposed at spaced points upon the inner surface of said leather base, and a plurality of rivets, each of which extends through the leather, the neoprene and one of said buttons, each said rivet having a flange which is anchored in the neoprene facing and in direct contact with said neoprene.

References Cited in the file of this patent

UNITED STATES PATENTS

| | | |
|---|---|---|
| 2,491,188 | Lesesne | Dec. 13, 1949 |
| 2,520,192 | Bacon | Aug. 29, 1950 |
| 2,522,277 | Knowland | Sept. 12, 1950 |
| 2,621,375 | Bacon | Dec. 16, 1952 |
| 2,630,603 | Freedlander et al. | Mar. 10, 1953 |

FOREIGN PATENTS

| | | |
|---|---|---|
| 16,954 | Great Britain | of 1905 |
| 23,675 | Great Britain | of 1894 |